US011106466B2

(12) United States Patent
Orzol et al.

(10) Patent No.: US 11,106,466 B2
(45) Date of Patent: Aug. 31, 2021

(54) DECOUPLING OF CONDITIONAL BRANCHES

(71) Applicant: INTERNATIONAL BUSINESS MACHINES CORPORATION, Armonk, NY (US)

(72) Inventors: Nicholas R. Orzol, Austin, TX (US); Michael J. Genden, Austin, TX (US); Hung Q. Le, Austin, TX (US); Dung Q. Nguyen, Austin, TX (US); Eula Faye A. Tolentino, Austin, TX (US); Brian W. Thompto, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 16/011,113

(22) Filed: Jun. 18, 2018

(65) Prior Publication Data
US 2019/0384607 A1 Dec. 19, 2019

(51) Int. Cl.
*G06F 9/38* (2018.01)
*G06F 9/30* (2018.01)

(52) U.S. Cl.
CPC ........ *G06F 9/3804* (2013.01); *G06F 9/30058* (2013.01); *G06F 9/3836* (2013.01); *G06F 9/3844* (2013.01)

(58) Field of Classification Search
None
See application file for complete search history.

(56) References Cited

U.S. PATENT DOCUMENTS

| 4,847,755 | A | * | 7/1989 | Morrison | G06F 8/445 712/203 |
| 4,991,080 | A | * | 2/1991 | Emma | G06F 9/3804 712/206 |
| 5,021,945 | A | * | 6/1991 | Morrison | G06F 8/445 712/216 |
| 5,155,843 | A | * | 10/1992 | Stamm | G06F 12/0804 711/E12.026 |
| 5,317,720 | A | * | 5/1994 | Stamm | G06F 9/3836 711/122 |
| 5,333,296 | A | * | 7/1994 | Bouchard | G06F 7/483 711/117 |

(Continued)

FOREIGN PATENT DOCUMENTS

EP 432774 A2 6/1991
JP 56022140 A * 2/1981

OTHER PUBLICATIONS

IBM Technical Disclosure Bulletin NA82081235 "Implementation ofa Byte Buffer for IBM 3033 Processor" Aug. 1982. (Year: 1982).*

(Continued)

*Primary Examiner* — Steven G Snyder
(74) *Attorney, Agent, or Firm* — Cantor Colburn LLP; Bryan Bortnick

(57) ABSTRACT

A computer processor includes an issue queue to receive an instruction, and one or more execution units to generate a condition code bit corresponding to the instruction. A branch condition queue is in signal communication with the issue queue, and receives the instruction from the issue queue before the at least one execution unit generates the condition code bit.

20 Claims, 10 Drawing Sheets

(56) References Cited

U.S. PATENT DOCUMENTS

| | | | |
|---|---|---|---|
| 5,394,529 A * | 2/1995 | Brown, III | G06F 9/3848 712/240 |
| 5,450,555 A * | 9/1995 | Brown, III | G06F 9/3848 712/218 |
| 5,471,591 A * | 11/1995 | Edmondson | G06F 9/3836 711/E12.024 |
| 5,481,689 A * | 1/1996 | Stamm | G06F 9/30036 711/202 |
| 5,487,156 A * | 1/1996 | Popescu | G06F 9/3802 712/217 |
| 5,488,730 A * | 1/1996 | Brown, III | G06F 9/3848 712/217 |
| 5,517,628 A * | 5/1996 | Morrison | G06F 8/445 712/234 |
| 5,542,058 A * | 7/1996 | Brown, III | G06F 9/3824 712/23 |
| 5,586,278 A | 12/1996 | Papworth et al. | |
| 5,721,855 A | 2/1998 | Hinton et al. | |
| 5,765,037 A * | 6/1998 | Morrison | G06F 8/445 713/502 |
| 5,809,320 A * | 9/1998 | Jain | G06F 9/3857 712/34 |
| 5,812,839 A | 9/1998 | Hoyt et al. | |
| 5,826,074 A | 10/1998 | Blomgren | |
| 5,854,934 A | 12/1998 | Hsu et al. | |
| 5,859,999 A | 1/1999 | Morris et al. | |
| 5,860,017 A | 1/1999 | Sharangpani et al. | |
| 5,867,698 A | 2/1999 | Cumming et al. | |
| 5,887,161 A * | 3/1999 | Cheong | G06F 9/3836 712/228 |
| 5,913,048 A * | 6/1999 | Cheong | G06F 9/3836 712/215 |
| 5,915,110 A | 6/1999 | Witt et al. | |
| 5,961,638 A | 10/1999 | Tran | |
| 5,966,544 A | 10/1999 | Sager | |
| 6,035,390 A * | 3/2000 | Burns | G06F 7/48 712/200 |
| 6,065,115 A | 5/2000 | Sharangpani et al. | |
| 6,098,167 A * | 8/2000 | Cheong | G06F 9/3863 712/217 |
| 6,101,577 A | 8/2000 | Tran | |
| 6,112,019 A * | 8/2000 | Chamdani | G06F 9/3836 712/214 |
| 6,212,603 B1 | 4/2001 | McInerney et al. | |
| 6,237,085 B1 * | 5/2001 | Burns | G06F 7/026 712/223 |
| 6,240,508 B1 * | 5/2001 | Brown, III | G06F 9/383 710/39 |
| 6,253,313 B1 * | 6/2001 | Morrison | G06F 8/445 712/226 |
| 6,263,427 B1 | 7/2001 | Cummins et al. | |
| 6,272,624 B1 | 8/2001 | Giacalone et al. | |
| 6,311,261 B1 * | 10/2001 | Chamdani | G06F 9/3836 712/23 |
| 6,357,024 B1 | 3/2002 | Dutton et al. | |
| 6,449,712 B1 | 9/2002 | Irie et al. | |
| 6,477,639 B1 | 11/2002 | Krishnan et al. | |
| 6,587,894 B1 | 7/2003 | Stracovsky et al. | |
| 6,615,366 B1 | 9/2003 | Grochowski et al. | |
| 6,622,241 B1 | 9/2003 | Brockmann et al. | |
| 6,625,749 B1 | 9/2003 | Quach | |
| 6,640,298 B1 | 10/2003 | Totsuka et al. | |
| 6,640,313 B1 | 10/2003 | Quach | |
| 6,732,238 B1 | 5/2004 | Evans et al. | |
| 6,772,368 B2 | 8/2004 | Dhong et al. | |
| 6,877,089 B2 | 4/2005 | Sinharoy | |
| 6,880,066 B2 | 4/2005 | Suetake | |
| 6,907,520 B2 | 6/2005 | Parady | |
| 6,976,125 B2 | 12/2005 | Kadambi et al. | |
| 6,981,176 B2 | 12/2005 | Fruehling et al. | |
| 7,051,186 B2 | 5/2006 | Asaad et al. | |
| 7,185,186 B2 | 2/2007 | McDonald | |
| 7,328,332 B2 | 2/2008 | Tran | |
| 7,337,271 B2 | 2/2008 | Emma et al. | |
| 7,340,643 B2 | 3/2008 | Grochowski et al. | |
| 7,398,377 B2 | 7/2008 | McDonald et al. | |
| 7,430,657 B2 | 9/2008 | Gat et al. | |
| 7,441,110 B1 | 10/2008 | Puzak et al. | |
| 7,461,312 B2 | 12/2008 | Tardif et al. | |
| 7,493,480 B2 | 2/2009 | Emma et al. | |
| 7,603,545 B2 * | 10/2009 | Sunayama | G06F 9/3804 712/234 |
| 7,765,387 B2 * | 7/2010 | Sunayama | G06F 9/321 712/233 |
| 7,783,869 B2 | 8/2010 | Grandou et al. | |
| 7,865,770 B2 | 1/2011 | Quach | |
| 8,904,156 B2 | 12/2014 | Shah et al. | |
| 9,916,185 B2 * | 3/2018 | Gschwind | G06F 12/0842 |
| 10,866,805 B2 * | 12/2020 | Grisenthwaite | G06F 21/79 |
| 2001/0049762 A1 | 12/2001 | Ohwada | |
| 2002/0073357 A1 | 6/2002 | Dhong et al. | |
| 2004/0003207 A1 * | 1/2004 | Sunayama | G06F 9/3842 712/218 |
| 2004/0003214 A1 * | 1/2004 | Sunayama | G06F 9/3844 712/234 |
| 2004/0128476 A1 * | 7/2004 | Nuckolls | G06F 9/30036 712/206 |
| 2004/0128488 A1 * | 7/2004 | Thimmannagari | G06F 9/384 712/235 |
| 2004/0133432 A1 * | 7/2004 | Sugumar | G06F 9/3013 712/218 |
| 2004/0133768 A1 * | 7/2004 | Thimmannagari | G06F 9/3004 712/228 |
| 2004/0153631 A1 * | 8/2004 | Thimmannagari | G06F 9/30127 712/218 |
| 2004/0153763 A1 | 8/2004 | Grochowski et al. | |
| 2004/0181726 A1 | 9/2004 | Vorbach et al. | |
| 2005/0138478 A1 | 6/2005 | Safford et al. | |
| 2005/0204194 A1 | 9/2005 | Curry | |
| 2005/0228977 A1 | 10/2005 | Cypher et al. | |
| 2005/0240793 A1 | 10/2005 | Safford et al. | |
| 2005/0268163 A1 | 12/2005 | Bancel et al. | |
| 2006/0224871 A1 | 10/2006 | Tran | |
| 2008/0022080 A1 * | 1/2008 | Craske | G06F 9/3017 712/225 |
| 2009/0172359 A1 | 7/2009 | Shen et al. | |
| 2009/0182991 A1 | 7/2009 | Quach | |
| 2009/0183035 A1 | 7/2009 | Butler et al. | |
| 2014/0164740 A1 * | 6/2014 | Gschwind | G06F 9/30058 712/205 |
| 2015/0268961 A1 | 9/2015 | Zuraski et al. | |
| 2017/0068539 A1 | 3/2017 | Dundas et al. | |
| 2017/0123844 A1 * | 5/2017 | Gschwind | G06F 12/0842 |
| 2017/0199739 A1 | 7/2017 | Kitchin | |
| 2018/0004527 A1 * | 1/2018 | Adeeb | G06F 9/3836 |
| 2018/0173534 A1 * | 6/2018 | Peled | G06F 9/3806 |
| 2019/0205140 A1 * | 7/2019 | Grisenthwaite | G06F 9/30087 |
| 2020/0150968 A1 | 5/2020 | Fatehi et al. | |

OTHER PUBLICATIONS

IBM Technical Disclosure Bulletin NN820697 "Technique for Minimizing Branch Delay Due to Incorrect Branch History Table Predictions" Jun. 1982. (Year: 1982).*

"Implementation of a Byte Buffer for IBM 3033 Processor" Aug. 1982, IP.com No. IPCQM000050018D. (Year: 1982).*

"Branch on Condition Decoding with Instruction Queues Empty" Sep. 1981, IP.com No. IPCOM000053146D. (Year: 1981).*

IBM Technical Disclosure Bulletin NN71053732 'Fast Branch Decision,' May 1971. (Year: 1971).*

B. Calder et al., "Fast & Accurate Instruction Fetch and Branch Prediction" Proceedings of 21 International Symposium on Computer Architecture, Apr. 18-21, 1994, 2-11.

* cited by examiner

DECOUPLING OF CONDITIONAL BRANCHES

BACKGROUND

The present invention generally relates to computing systems, and more specifically, to a system for processing branch instructions dependent on a condition code.

Data processing and computing systems typically utilize branch instructions to implement control flow in program loops and conditionals (i.e., executing a particular sequence of instructions if certain conditions are satisfied). Upon dispatch, a branch instruction is delivered to an issue queue along with various other types of instructions. Some of these branch instructions may be coupled to a condition code (CC), also referred to as a CC bit. The term "coupled" refers to a situation where a branch instruction must wait for issuance of an assigned CC bit before the branch instruction can be dispatched from the issue queue. Once the CC bit is issued, the branch instruction will be dispatched from the issue queue and delivered to a branch execution unit (BEU). The BEU will then generate a branch target address (BTA) and will use the CC bit to resolve the branch instruction, i.e., to determine the branch direction of the branch instruction.

SUMMARY

According to a non-limiting embodiment, a computer processor includes an issue queue to receive an instruction, and one or more execution units to generate a condition code bit corresponding to the instruction. A branch condition queue is in signal communication with the issue queue and receives the instruction from the issue queue before the at least one execution unit generates the condition code bit.

According to another non-limiting embodiment, a computer-implemented method of processing instructions executed by a computer processor comprises dispatching at least one instruction to an issue queue, and generating, via at least one execution unit, a condition code bit corresponding to the at least one instruction. The method further includes issuing the at least one instruction from the issue queue to a branch condition queue before the at least one execution unit generates the condition code bit.

According to yet another non-limiting embodiment, a computer program product is provided to control an electronic computer processor to process branch instructions. The computer program product comprises a computer readable storage medium having program instructions embodied therewith. The program instructions are executable by the electronic computer processor to perform operations that include dispatching at least one instruction to an issue queue, and generating, via at least one execution unit, a condition code bit corresponding to the at least one instruction. The operations further include issuing the at least one instruction from the issue queue to a branch condition queue before the at least one execution unit generates the condition code bit.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
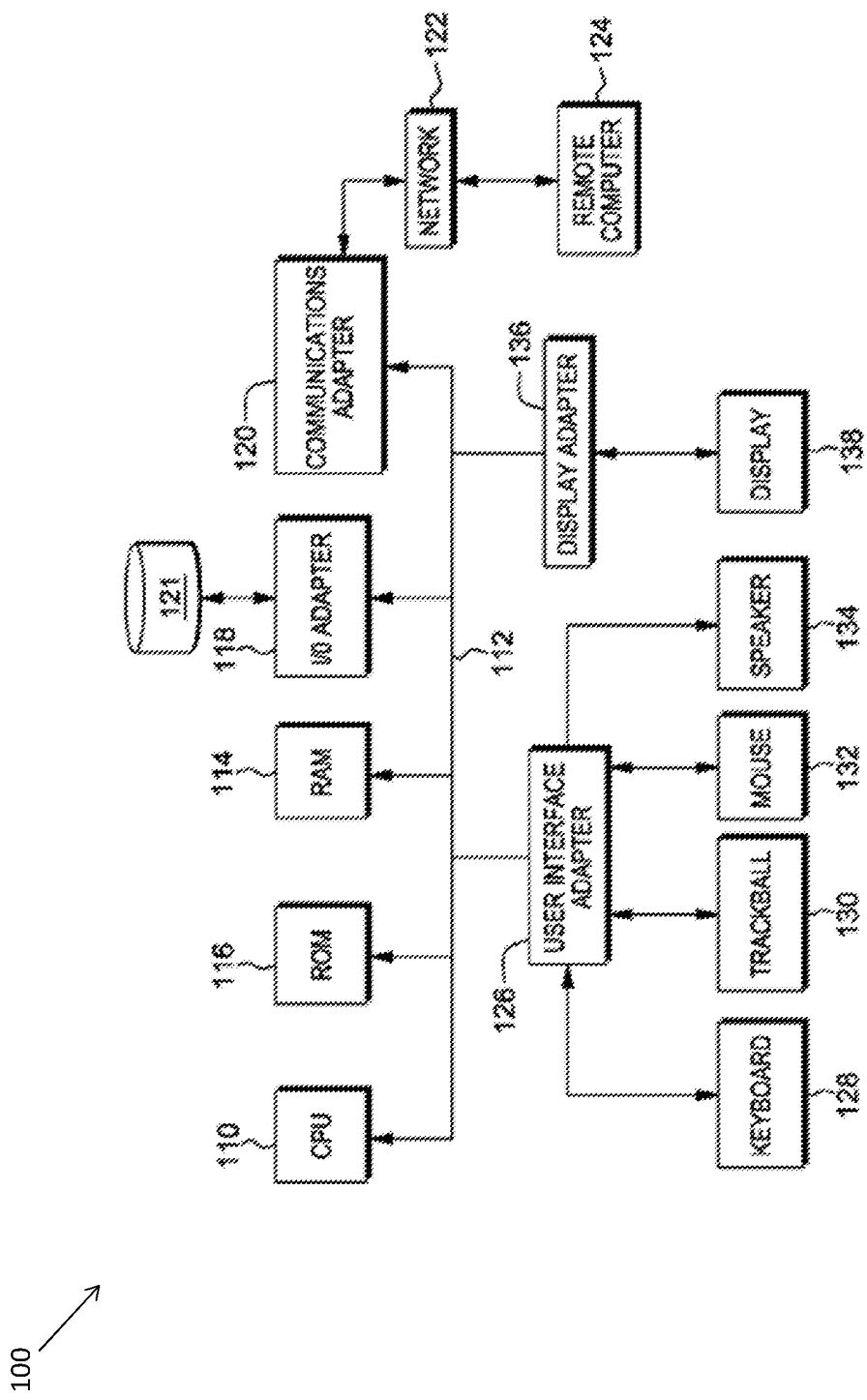
FIG. 1 depicts an example of a computer processing environment according to a non-limiting embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, branch instructions may be viewed as undesirable for various reasons. In particular, it is noted that most modern data processing architectures include features known as branch prediction. In these architectures, a prediction is made as to which of two or more branch directions (i.e., paths) the instruction stream will follow after encountering a branch instruction, i.e. whether the branch instruction will "branch" or "not branch". If the initial prediction is correct, then the process continues as expected and machine processing time is improved (i.e., speeded up). When, however, the prediction is incorrect, the machine hardware must backtrack through the path taken, and then take another path which slows the overall processing time. In some cases completely flush branch instruction from the data. In this scenario, the branch instruction is seen to be a detriment to overall processing speed.

Branch instructions also consume the aforementioned branch prediction resources and the main issue queue. As a result, the prediction resources and the main issue queue may not be available for other instruction streams being executed by a processor. In terms of the main issue queue, branch instructions that are coupled to a CC must wait in the main issue queue until its CC bit is available before it can be dispatched to the BEU. These branch instructions which are stalled in the main issue queue can create a bottleneck or fully stall the issue queue dispatch. Thus, branch instructions are not only potentially wasteful in and of themselves, they also deprive other instruction streams of limited, yet valuable computer resources, while also reducing the overall performance of the computing system.

Turning now to a more detailed description of aspects of the present invention, FIG. 1 depicts an example of a computer processing environment 100 capable of supporting various aspects of the present teachings. The computer processing environment 100 includes, for example, a central processing unit (CPU) 110, which is coupled to various other components by an interconnect 112. The various components include, for example, a read-only memory (ROM) 116 having a basic input/output system (BIOS) that controls certain basic functions of the processing environment, a random access memory (RAM) 114, an I/O adapter 118, and a communications adapter 120. The I/O adapter 118 may be a small computer system interface (SCSI) adapter that communicates with a storage device 121. Communications adapter 120 interfaces interconnect 112 with a network 122, which enables processing environment 100 to communicate with other systems, such as remote computer 124.

The interconnect 112 also has input/output devices connected thereto via a user interface adapter 126 and a display adapter 136. Keyboard 128, trackball 130, mouse 132 and speaker 134 are all interconnected to bus 112 via user interface adapter 126. Display 138 is connected to system bus 112 by display adapter 136. In this manner, processing environment 100 receives input, for example, through keyboard 128, trackball 130, and/or mouse 132, and provides output, for example, via network 122, on storage device 121, speaker 134 and/or display 138, as examples. The hardware elements depicted in processing environment 100 are not intended to be exhaustive, but rather represent example components of a processing environment in one embodiment.

Operation of a processing environment 100 can be controlled by program code, such as firmware and/or software, which typically includes, for example, an operating system such as AIX® (AIX is a trademark of International Business Machines Corporation) and one or more application or middleware programs. As used herein, firmware includes, e.g., the microcode, millicode and/or macrocode of the processor. It includes, for instance, the hardware-level instructions and/or data structures used in the implementation of higher level machine code. In one embodiment, it includes, for instance, proprietary code that is typically delivered as microcode that includes trusted software or microcode specific to the underlying hardware and controls operating system access to the system hardware.

Figure 2:
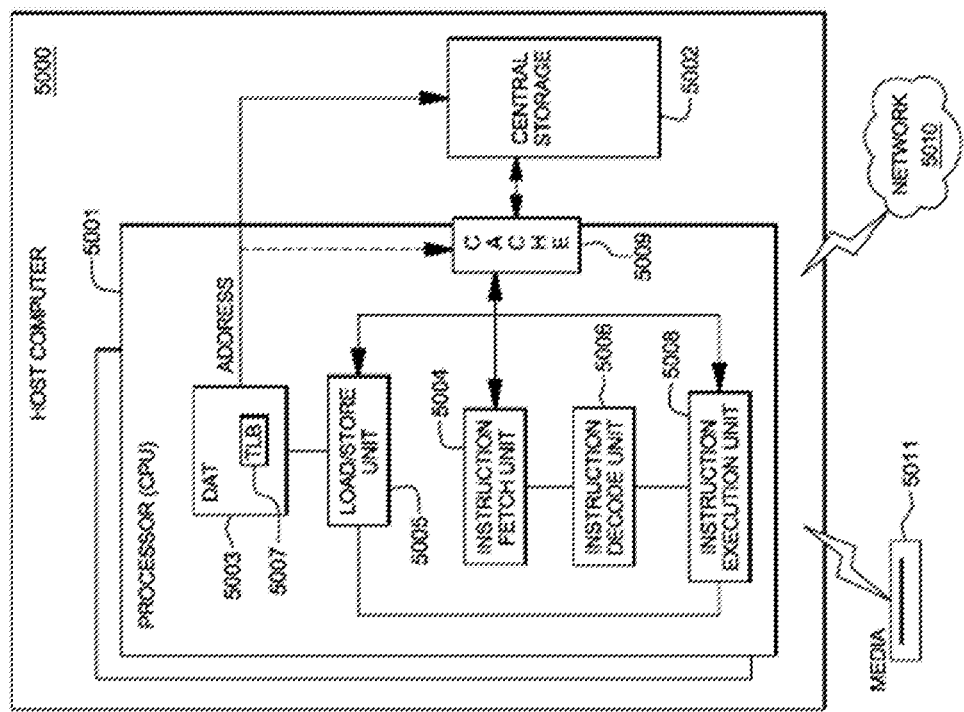
FIG. 2 depicts host computer system included in the computer processing environment according to a non-limiting embodiment.

Turning to FIG. 2, representative components of a Host Computer system 5000 to implement one or more aspects are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU.

In some implementations, the lower level caches are split to provide separate low-level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically, several execution units 5008 are employed, for example an arithmetic execution unit, a floating-point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an "Extract Cache Attribute" instruction which returns the size of a cache line in bytes. A model may also provide "Prefetch Data instructions and "Prefetch Data Relative Log" instructions, which effect the prefetching of storage into the data or instruction cache or the releasing of data from the cache. On devices that implement separate caches for instructions and data operands, a significant delay may be experienced if the program stores into a cache line from which instructions are subsequently fetched, regardless of whether the store alters the instructions that are subsequently fetched.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture®). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0.

For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

In one embodiment, the invention may be practiced by software (sometimes referred to licensed internal code, firmware, micro-code, milli-code, pico-code and the like, any of which would be consistent with one or more aspects the present invention). A software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 3:
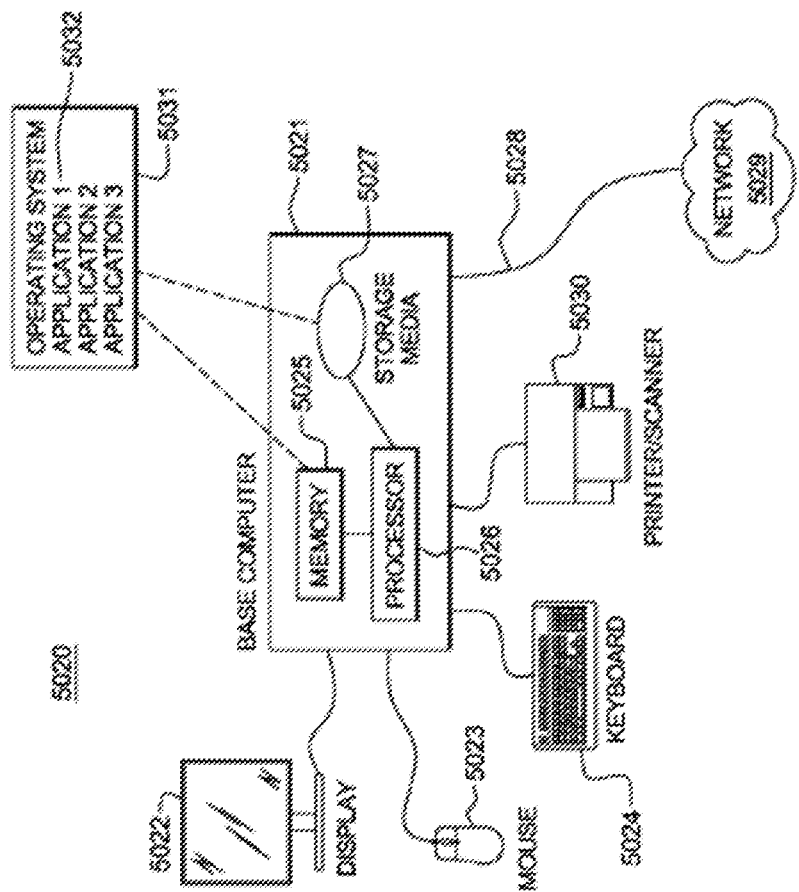
FIG. 3 depicts a hardware workstation according to a non-limiting embodiment.

Referring to FIG. 3, an example of a workstation or server hardware system 5020 capable of supporting various aspects of the present teachings. The system 5020 includes a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc.

Figure 4:
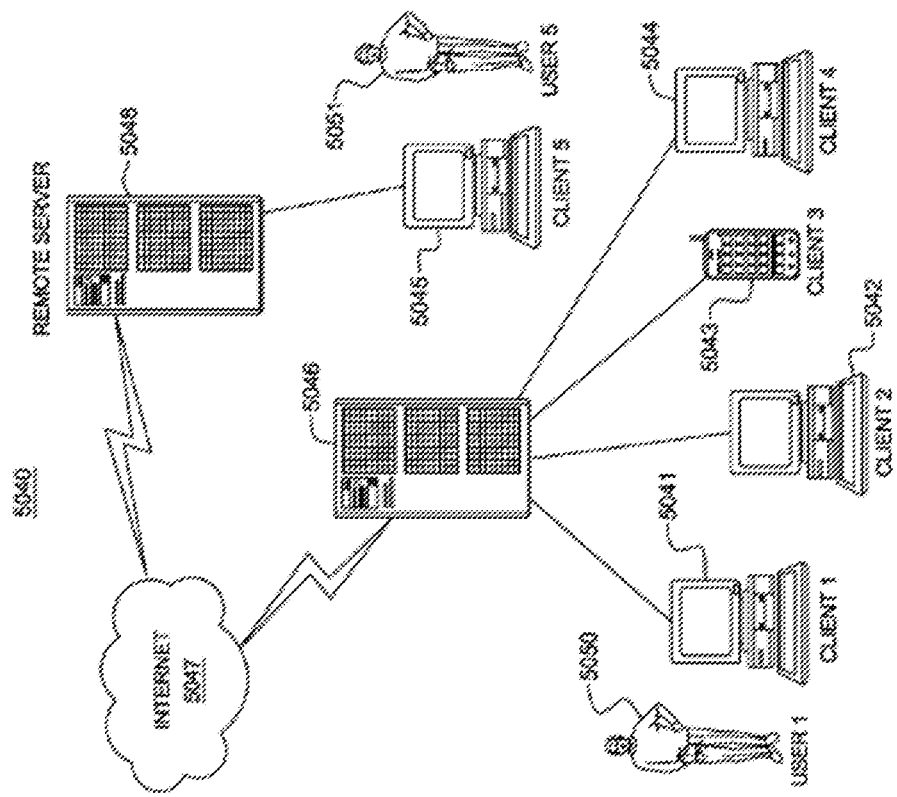
FIG. 4 depicts a data processing network according to a non-limiting embodiment.

FIG. 4 illustrates a data processing network 5040 capable of supporting various aspects of the present teachings. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 4, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 3 and FIG. 4, software programming code which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025 and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor 5026 (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 5:
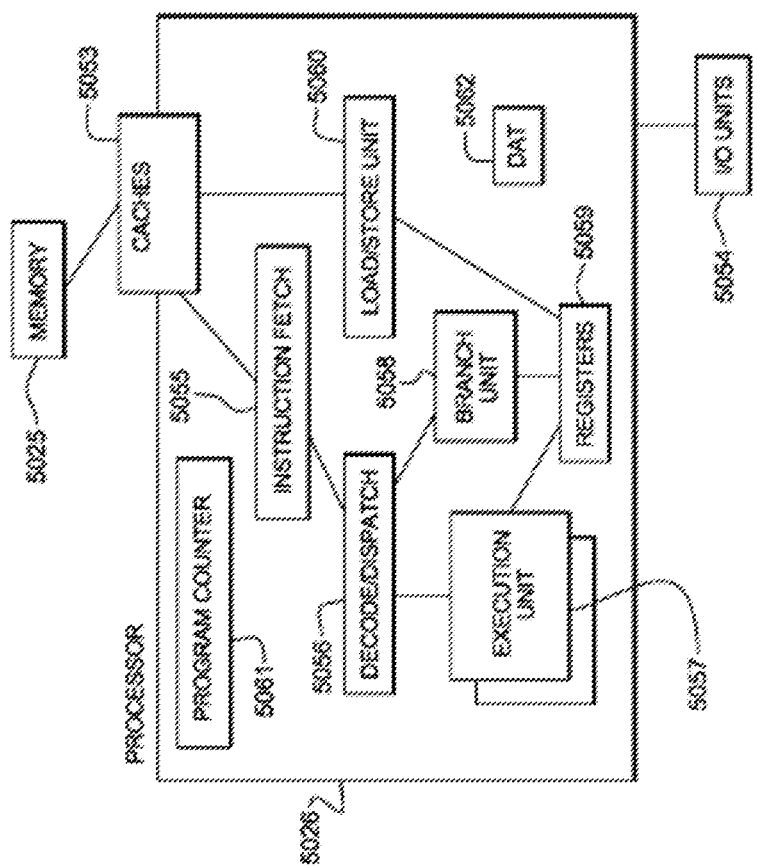
FIG. 5 depicts a computer processor included in the host computer system according to a non-limiting embodiment.

FIG. 5 illustrates an example of a processor 5026 capable of supporting various aspects of the present teachings. The processor 5026 includes one or more levels of cache 5053, which are employed to buffer memory blocks in order to improve processor performance. The cache 5053 is a high-speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape, etc.) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a program status word (PSW) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically, an instruction fetch unit 5055 is employed to fetch instructions on behalf of the processor 5026. The fetch unit either fetches next sequential instructions, target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

The execution of one or more instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

The processor 5026 accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 6:
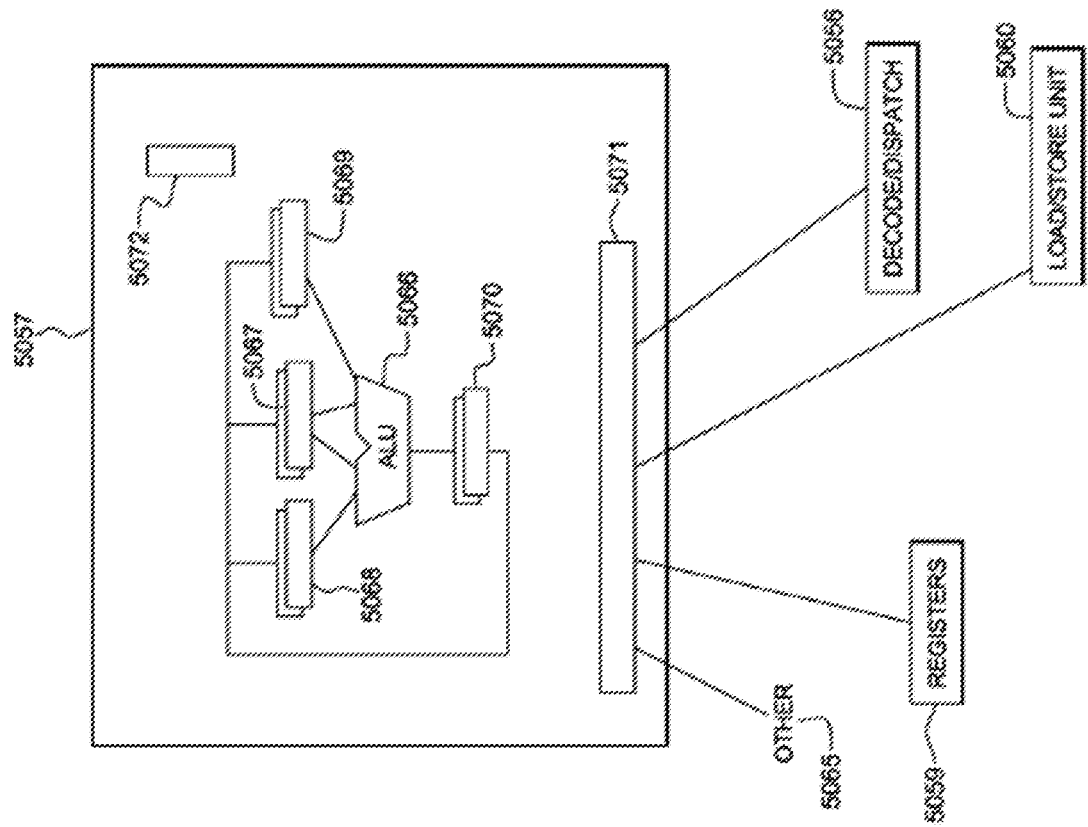
FIG. 6 illustrates an execution unit included in the computer processor according to a non-limiting embodiment.

The processor 5026 can include one or more individual computing units. Turning to FIG. 6, for example, an execution unit 5057 is illustrated according to a non-limiting embodiment. The execution unit 5057 may communicate with architected general registers 5059, a decode/dispatch unit 5056, a load store unit 5060, and other 5065 processor units by way of interfacing logic 5071. The execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as, for example, "and", "or", "exclusive-or (XOR)", "rotate", and shift". Preferably the ALU supports specialized operations that are design dependent. Other circuits may provide other architected facilities 5072 including condition codes and recovery support logic for example. Typically, the result of an ALU operation is held in an output register circuit 5070 which can forward the result to a variety of other processing functions. There are many arrangements of processor units, the present description is only intended to provide a representative understanding of one embodiment.

An ADD instruction, for example, would be executed in an execution unit 5057 having arithmetic and logical functionality while a floating-point instruction, for example, would be executed in a floating-point execution having specialized floating-point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as "Shift", "Rotate", "And", "Or" and "XOR", as well as a variety of algebraic functions including any of "add", "subtract", "multiply", and "divide". Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12-bit field defines an address of a 4,096-byte block and is commonly described as a 4 Kbyte (Kilo-byte) block, for example.

Figure 7:
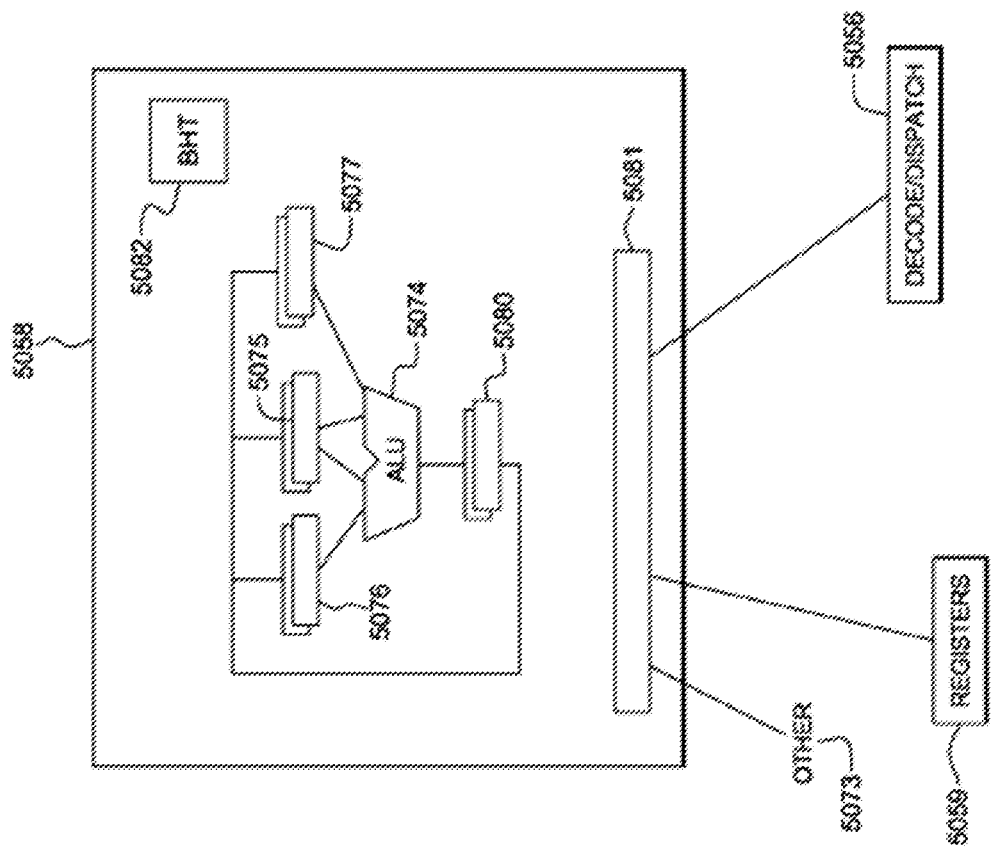
FIG. 7 illustrates a branch computing unit included in the computer processor according to a non-limiting embodiment.

Similarly, a branch computing unit 5058 is illustrated in FIG. 7 according to a non-limiting embodiment. Branch instruction information for executing a branch instruction can be sent to the branch unit 5058, which often employs a branch prediction algorithm such as a branch history table (BHT) 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

Figure 8:
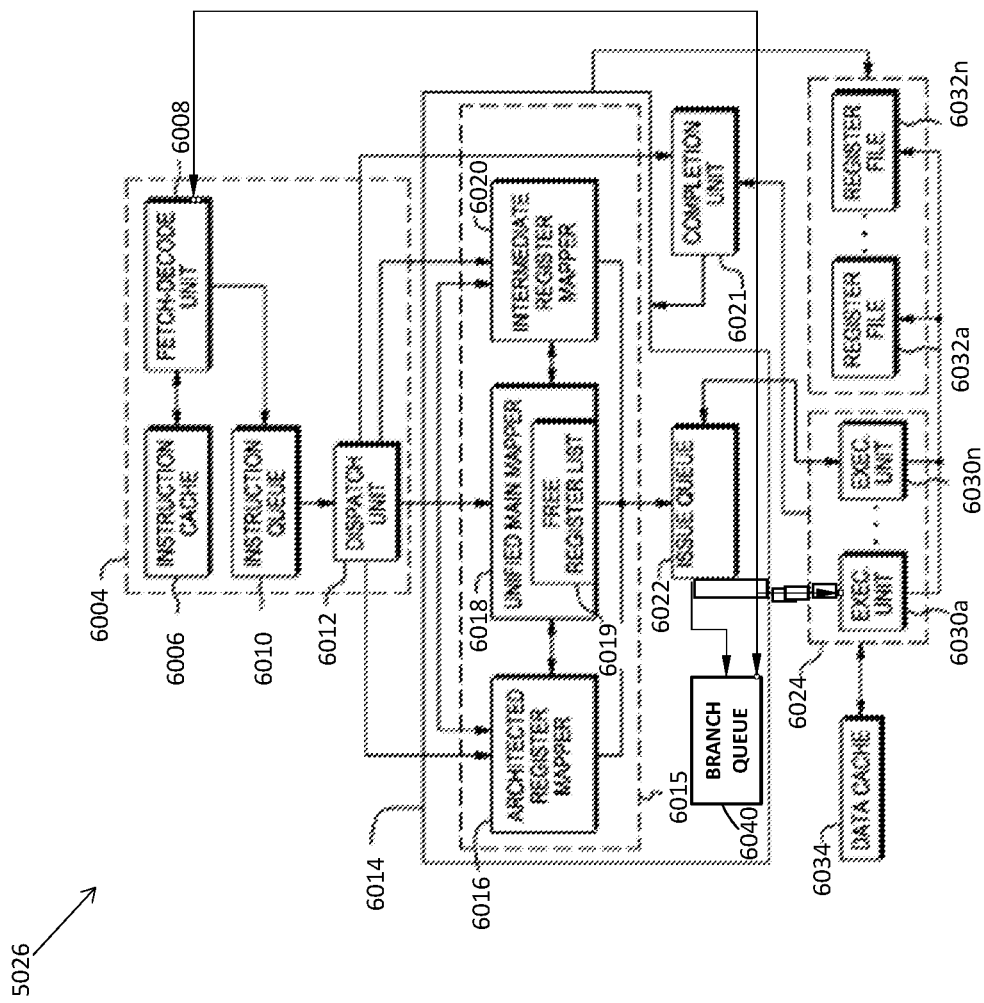
FIG. 8 is a block diagram illustrating various components included in the computer processor according to a non-limiting embodiment.

Turning now to FIG. 8, further details of the processor 5026 (e.g., central processing unit 110 of FIG. 1) of the processing environment 100 are described according to one or more non-limiting embodiments. In one example, the processor 5026 is a super-scalar processor, which retrieves instructions from memory (e.g., RAM 114 of FIG. 1) and loads them into instruction sequencing logic (ISL) 6004 of the processor 5026. The instruction sequencing logic includes, for instance, a Level 1 Instruction cache (L1 I-cache) 6006, a fetch-decode unit 6008, an instruction queue 6010 and a dispatch unit 6012. In one example, the instructions are loaded in L1 I-cache 6006 of ISL 6004 and they are retained in L1 I-cache 6006 until they are needed. Otherwise, they will be replaced if they are not needed. Instructions are retrieved from L1 I-cache 6006 and decoded by fetch-decode unit 6008. After decoding a current instruction, the current instruction is loaded into instruction queue 6010. Dispatch unit 6012 dispatches instructions from instruction queue 6010 into register management unit 6014, as well as completion unit 6021. Completion unit 6021 is coupled to a general execution engine 6024 and a register management unit 6014 and is configured to determine when an issued instruction has completed.

When dispatch unit 6012 dispatches a current instruction, unified main mapper 6018 of register management unit 6014 allocates and maps a destination logical register number to a physical register within physical register files 6032a-6032n that is not currently assigned to a logical register. The destination is said to be renamed to the designated physical register among physical register files 6032a-6032n. Unified main mapper 6018 removes the assigned physical register from a list 6019 of free physical registers stored within unified main mapper 6018. Subsequent references to that destination logical register will point to the same physical register until fetch-decode unit 6008 decodes another instruction that writes to the same logical register. Then, unified main mapper 6018 renames the logical register to a different physical location selected from free list 6019, and the mapper is updated to enter the new logical-to-physical register mapper data. When the logical-to-physical register mapper data is no longer needed, the physical registers of old mappings are returned to free list 6019. If free physical register list 6019 does not have enough physical registers, dispatch unit 6012 suspends instruction dispatch until the needed physical registers become available.

After the register management unit 6014 has mapped the current instruction, issue queue 6022 issues the current instruction to general execution engine 6024. The general execution engine 6024 is sometimes referred to a vector and scalar unit (VSU). The VSU 6024 typically includes a condition register (CR), a count register (CTR), a length register (LR) and/or a target address register (TAR). In addition, the VSU 6024 includes one or more individual execution units (EUs) 6030a-6030n. Execution units 6030a-6030n are of various types including, but not limited to, a branch execution unit, a floating-point (FP), fixed-point (FX), and load/store (LS). In this example, execution unit 6030a is referred to as a branch execution unit 6030a.

The general execution engine 6024 exchanges data with data memory (e.g., RAM 114, ROM 116 of FIG. 1) via a data cache 6034. Moreover, issue queue 6022 may contain instructions of floating point type or fixed-point type, and/or load/store instructions. However, it should be appreciated that any number and types of instructions can be used. During execution, EUs 6030a-6030n obtain the source operand values from physical locations in register files 6032a-6032n and store result data, if any, in register files 6032a-6032n and/or data cache 6034.

Register management unit 6014 includes, for instance: (i) mapper cluster 6015, which includes architected register mapper 6016, unified main mapper 6018, and intermediate register mapper 6020; and (ii) issue queue 6022. Mapper cluster 6015 tracks the physical registers assigned to the logical registers of various instructions. In one embodiment, architected register mapper 6016 has 16 logical (i.e., not physically mapped) registers of each type that store the last, valid (i.e., checkpointed) state of logical-to-physical register mapper data. However, it should be recognized that different processor architectures can have more or less logical registers than described in this embodiment. Further, architected register mapper 6016 includes a pointer list that identifies a physical register which describes the checkpointed state. Physical register files 6032a-6032n typically contain more registers than the number of entries in architected register mapper 6016. It should be noted that the particular number of physical and logical registers that are used in a renaming mapping scheme can vary.

In contrast, unified main mapper 6018 is typically larger (typically contains up to 20 entries) than architected register mapper 6016. Unified main mapper 6018 facilitates tracking of the transient state of logical-to-physical register mappings. The term "transient" refers to the fact that unified main mapper 6018 keeps track of tentative logical-to-physical register mapping data as the instructions are executed out-of-order (OoO). Out-of-order execution typically occurs when there are older instructions which would take longer (i.e., make use of more clock cycles) to execute than newer instructions in the pipeline. However, should an out-of-order instruction's executed result require that it be flushed for a particular reason (e.g., a branch miss-prediction), the processor can revert to the checkpointed state maintained by architected register mapper 6016 and resume execution from the last, valid state.

Unified main mapper 6018 makes the association between physical registers in physical register files 6032a-6032n and architected register mapper 6016. The qualifying term "unified" refers to the fact that unified main mapper 6018 obviates the complexity of custom-designing a dedicated mapper for each of the register files 6032a-6032n (e.g., general-purpose registers (GPRs), floating-point registers (FPRs), fixed-point registers (FXPs), exception registers (XERs), condition registers (CRs), etc.).

In addition to creating a transient, logical-to-physical register mapper entry of an out-of-order instruction, unified main mapper 6018 also keeps track of dependency data (i.e., instructions that are dependent upon the finishing of an older instruction in the pipeline), which is used for instruction ordering. Once unified main mapper 6018 has entered an instruction's logical-to-physical register translation, the instruction passes to issue queue 6022. In at least one embodiment, the unified main mapper 6018 can assign an instruction tag (referred to as an "ITAG") to each instruction. The ITAG can indicate the older dependent instruction or CC bit corresponding to a given instruction that is passed to the issue queue 6022. In this manner, the issue queue 6022 can actively determine (i.e., "snoop") whether a particular condition code bit has issued or an older dependent instruction has completed so that the corresponding instruction can be issued.

Issue queue 6022 serves as the gatekeeper before the instruction is issued to one or more execution units 6030a-6030n for execution. As a general rule, an instruction cannot leave issue queue 6022 if it depends upon an older instruction to finish. For this reason, unified main mapper 6018 tracks dependency data by storing the issue queue position data for each instruction that is mapped. Once the instruction has been executed by general execution engine 6024, the instruction is said to have "finished" and is retired from issue queue 6022.

The processor 5026 further includes a branch coupling queue (BCQ) 6040 in signal communication with the branch execution unit 6030a, the issue queue 6022, and the fetch-decode unit 6008. The BCQ is separate from the main issue queue and is configured to store the branch target address dependent CC ITAG before the actual CC bit is made available. In this manner, once the CC bit becomes available, the conditional branch can be quickly resolved without waiting for it be dispatched from the main issue queue.

Register management unit 6014 may receive multiple instructions from dispatch unit 6012 in a single cycle so as to maintain a filled, single issue pipeline. The dispatching of instructions is limited by the number of available entries in unified main mapper 6018. In some mapper systems, which lack intermediate register mapper 6020, if unified main mapper 6018 has a total of 20 mapper entries, there is a maximum of 20 instructions that can be in flight (i.e., not checkpointed) at once. Thus, dispatch unit 6012 can conceivably dispatch more instructions than what can actually be retired from unified main mapper 6018. The reason for this bottleneck at the unified main mapper 6018 is due to the fact that, conventionally, an instruction's mapper entry could not retire from unified main mapper 6018 until the instruction "completed" (i.e., all older instructions have "finished" executing).

The intermediate register mapper 6020 serves as a non-timing-critical register for which a "finished," but "incomplete" instruction from unified main mapper 6018 could retire to (i.e., removed from unified main mapper 6018) in advance of the instruction's eventual completion. Once the instruction "completes," completion unit 6021 notifies intermediate register mapper 6020 of the completion. The mapper entry in intermediate register mapper 6020 can then update the architected coherent state of architected register mapper 6016 by replacing the corresponding entry that was presently stored in architected register mapper 6016.

Figure 9:
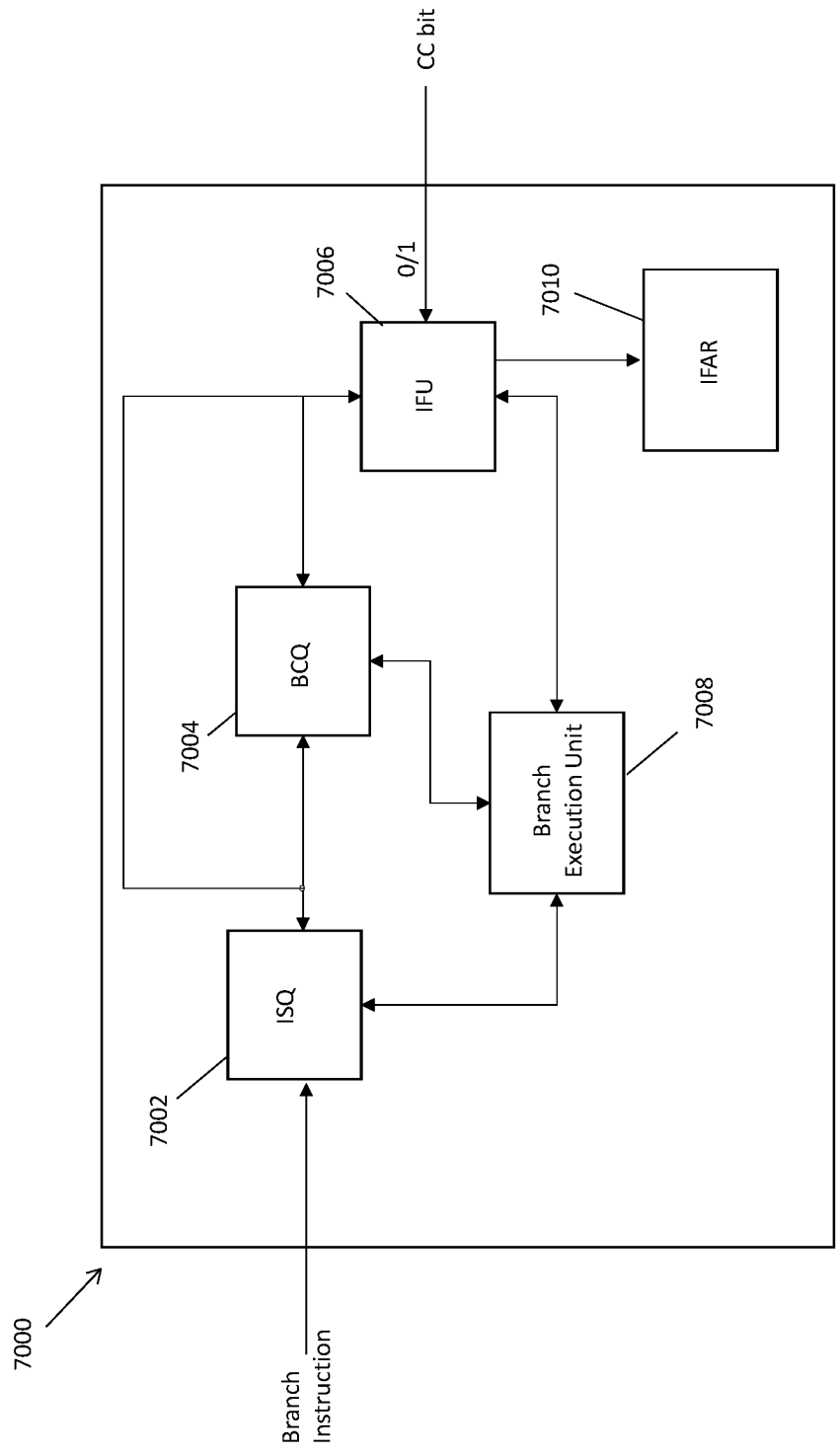
FIG. 9 is a block diagram of a processor configured to issue branch instructions from an issue queue independently from the availability of a corresponding condition code according to a non-limiting embodiment.

Turning to FIG. 9, a processor 7000 configured to issue branch instructions from a main issue queue independently from the availability of the corresponding condition code is illustrated according to a non-limiting embodiment. The processor 7000 includes a main issue queue (ISQ) 7002, a branch condition queue (BCQ) 7004, an information fetch unit (IFU) 7006, a branch execution unit 7008, and an instruction Fetch Address Register (IFAR) 7010. Any one of the main issue queue 7002, the branch condition queue 7004, the IFU 7006, and the branch execution unit 7008 can be constructed as an individual electronic hardware controller that includes memory and a processor configured to execute algorithms, logic and/or and computer-readable program instructions stored in the memory.

The main issue queue 7002 receives a dispatched branch instruction and determines whether the branch instruction is dependent on a condition code. When a condition code is necessary to resolve the branch instruction, the main issue queue 7002 determines if the condition code (i.e., the CC bit) is available. When the CC bit(s) is available at the time the branch instruction is dispatched, the branch instruction is resolved accordingly without utilizing the branch condition queue 7004. The term "resolving" refers to the comparing of a predicted result to an actual result, and providing the correct instruction address to the IFAR 7010. Resolving a branch instruction can occur when executing a branch and is the part of an execution split out of the normal pipeline when branch instructions enter the branch condition queue 7004. In at least one embodiment, the branch instruction is resolved by comparing the predicted CC bit against the actual CC bit. If the bits match, no action is taken. If the bits do not match, then all younger (more speculative) instructions are flushed and the correct instruction address is provided to the branch condition queue 7004.

When, however, the CC bit(s) is unavailable, the main issue queue 7002 dispatches the branch instruction directly to the branch execution unit 7008 and the IFU 7006. Therefore, unlike conventional processors, the branch instruction is dispatched from the main issue queue 7002 without waiting for the actual CC bit(s) to become available. In other words, the branch instruction can be viewed as being "decoupled" from its CC bit(s). In at least one embodiment, the main issue queue 7002 can communicate with the branch condition queue 7004 to determine whether the branch condition queue 7004 has space available to receive the dispatched branch instruction. For example, the branch condition queue 7004 may accept new branch instructions if the storage space (e.g., hole count) is less than a threshold value. When the hole count is less than the threshold value, the main issue queue 7002 dispatches the branch instruction without waiting for the CC bit. When, however, the hole count is greater or equal to the threshold value, the main issue queue 7002 either holds the branch instruction until storage space in the branch condition queue 7004 becomes available or until the CC bit becomes available.

The branch execution unit 7008 generates a branch target address corresponding to the branch instruction, and stores the branch target address in the branch condition queue 7004. The branch target address indicates the address which is accessed upon resolving the branch instruction (i.e., based on whether the instruction branches or does not branch). For example, when the branch instruction branches, a first branch target address is accessed. When, however, the branch instruction does not branch a second different branch target address is accessed. In at least one embodiment, a branch target address entry is stored in the branch condition queue 7004 on the condition that the branch instruction did not flush due to its dependency on a counter register (CTR). When a branch instruction is dependent on both a CC and the CTR, it is possible that the branch instruction can be determined to be a "not-taken" branch if the CTR criteria is not met. When this case is detected, the branch instruction can be resolved without waiting the actual CC value.

The IFU 7006 is configured to generate an ITAG indicating the condition code that corresponds to the dispatched branch instruction. In at least one embodiment, the ITAG can serve as a predicted CC bit(s) that predicts the value (e.g., a "0" bit or a "1" bit) of the actual CC bit(s) to be generated by the branch execution unit 7008. Once the ITAG is generated, the IFU 7006 will monitor the branch execution unit 7008 (i.e., snoop) to determine when the actual CC bit corresponding to the branch instruction is made available. In response to a snoop hit, the IFU 7006 will obtain the corresponding CC bit(s) and write it into the branch condition queue 7004. In at least one embodiment, the CC bit(s) is coupled or bundled with the branch target address stored in the branch condition queue 7004.

Once the actual CC bit(s) is loaded in the branch condition queue 7004, the branch instruction can be resolved using the branch execution unit 7008 and the IFU 7006 so that the correct branch target address can be accessed. For example, when the actual CC bit(s) is loaded in the branch condition queue 7004 (e.g., either from snoop hit or from the main issue queue 7002 at issue time), the IFU 7006 can proceed to resolve the branch instruction by comparing the predicted CC bit(s) (indicated by the ITAG) stored in the branch condition queue 7004 with the actual CC bit(s) generated by the branch execution unit 7008. In at least one embodiment, the branch is resolved by the IFU 7006 instead of the branch execution unit 7008. In one more embodiment, the IFU 7006 and branch execution unit 7008 can both resolve branches independently, and then decide to finish and flush the instruction. The IFU 7006 then reads out the associated branch target address and outputs it to the IFAR 7010 if the actual CC bit(s) is incorrectly predicted. Otherwise, it is not necessary for the IFAR 7010 to use the address. The IFU 7006 can also read out the associated branch target address and output it to the IFAR 7010 if a redirection is required. In any case once the branch instruction is resolved, the associated branch target address, ITAG, and CC bit(s) are then completely removed (i.e., flushed) from the branch condition queue 7004.

In at least one embodiment, the branch instructions loaded in the branch condition queue 7004 are resolved according to a priority scheme. For example, the branch instructions are resolved according to a first-in-first-out (FIFO) priority basis, assuming the actual CC bit(s) for a given branch instruction is available. In addition, there may be scenarios where a branch instruction stored in the branch condition queue 7004 and a non-condition instruction stored in the main issue queue 7002 are simultaneously ready to be resolved. In this scenario, instructions stored in the branch condition queue 7004 can be given a higher priority and resolved ahead of the instructions stored in the main priority queue 7002. The "losing" instruction can then be moved into the branch instruction queue 7004. In this manner, storage space in the main issue queue 7002 is made available, while the losing instruction realizes an increase in priority status.

Figure 10:
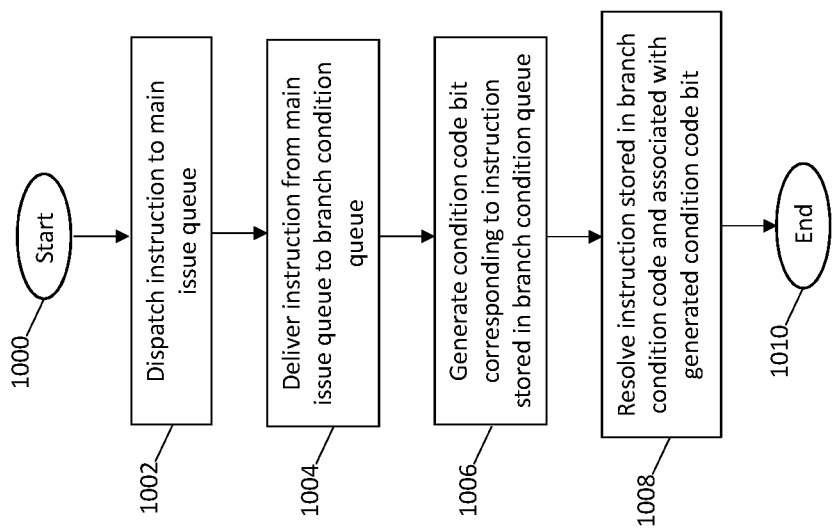
FIG. 10 is a flow diagram illustrating a method of processing branch instructions according to a non-limiting embodiment.

With reference to FIG. 10, a method of processing branch instructions executed by a computer processor is illustrated according to a non-limiting embodiment. The method begins at operation 1000, and at operation 1002 one or more instructions are dispatched to a main issue queue. At operation 1004, a selected instruction is dispatched from the main issue queue and delivered to a branch condition queue. At operation 1006, an execution unit generates a condition code bit corresponding to the instruction stored in the branch condition queue. The condition code bit can correspond to the most recent dispatched instruction, or an instruction previously stored in the branch condition queue. At operation 1008, an instruction stored in the branch condition queue and associated with the generated condition code is resolved according to a priority scheme, and the method ends at operation 1010. Accordingly, a branch instruction can be dispatched from the main issue queue without waiting for the actual CC bit(s) to become available. In this manner, the branch instruction is effectively decoupled from its CC bit(s) such that bottlenecks at the main issue queue are reduced and storage space in the main issue queue can be made available to store other instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer processor comprising:
an issue queue configured to receive at least one instruction;
at least one execution unit configured to generate a condition code bit corresponding to the at least one instruction, the at least one execution unit comprising:
an information fetch unit (IFU) in direct signal communication with the issue queue via a first signal path, the IFU configured to obtain the condition code bit and a branch instruction, and conditionally resolve the branch instruction based on the condition code bit; and
a branch condition queue in direct signal communication with each of the issue queue and the IFU, the branch condition queue configured to receive the at least one instruction from the issue queue before the at least one execution unit generates the condition code bit,
wherein the first signal path bypasses the branch condition queue, and wherein the issue queue determines an availability of the condition code bit based on the communication with the IFU via the first signal path.

2. The computer processor of claim 1, wherein the at least one instruction is a branch instruction that is dependent on a condition code.

3. The computer processor of claim 2, wherein the at least one execution unit comprises:
a branch execution unit configured to generate a branch target address corresponding to the branch instruction, wherein the IFU is in direct signal communication with the branch execution unit via a second signal path, the IFU configured to obtain the branch instruction from the branch condition queue and resolve the branch instruction based on the condition code bit.

4. The computer processor of claim 3, wherein the IFU generates an instruction tag indicating a predicted condition code corresponding to the branch instruction, and resolves the branch instruction in response to the condition code bit matching the predicted condition code indicated by the instruction tag.

5. The computer processor of claim 4, wherein the branch condition queue stores a plurality of different branch instructions, and dispatches each branch instruction based on a first-in-first-out (FIFO) priority scheme.

6. The computer processor of claim 4, wherein the issue queue stores a non-condition instruction configured to resolve independently from a condition code.

7. The computer processor of claim 6, wherein the branch instruction is dispatched from the branch condition queue before the non-condition instruction is dispatched from the issue queue when condition the code bit is available.

8. A computer-implemented method of processing instructions executed by a computer processor, the method comprising:
dispatching at least one instruction to an issue queue;
generating, via at least one execution unit, a condition code bit corresponding to the at least one instruction;
providing the condition code bit to an information fetch unit (IFU) in direct signal communication with the issue queue via a first signal path;
conditionally issuing the at least one instruction from the issue queue directly to a branch condition queue before the at least one execution unit generates the condition code bit; and
conditionally resolving the branch instruction using the IFU based on the condition code bit,
wherein the first signal path bypasses the branch condition queue, and wherein the issue queue determines an availability of the condition code bit based on the communication with the IFU via the first signal path.

9. The method of claim 8, wherein the at least one instruction is a branch instruction that is dependent on a condition code.

10. The method of claim 9, wherein issuing the at least one instruction from the issue queue comprises:
generating, via a branch execution unit, a branch target address corresponding to the branch instruction;
generating, via an information fetch unit (IFU), an instruction tag indicating a predicted condition code corresponding to the branch instruction; and
storing the instruction tag in the branch condition queue along with the corresponding branch instruction.

11. The method of claim 10, further comprising issuing the branch instruction from the branch condition queue when the condition code bit becomes available, and resolving the branch instruction via the IFU based on the condition code bit.

12. The method of claim 11, wherein resolving the branch instruction further comprises comparing, via the IFU, the condition code bit to the predicted condition code indicated by the instruction tag, and resolving the branch instruction in response to the condition code bit matching the predicted condition code indicated by the instruction tag.

13. The method of claim 12, further comprising storing a plurality of different branch instructions in the branch condition queue, and issuing each branch instruction from the branch condition queue to the IFU based on a first-in-first-out (FIFO) priority scheme.

14. The method of claim 12, further comprising storing, in the issue queue, at least one non-condition instruction that is configured to resolve independently from a condition code.

15. The method of claim 14, further comprising dispatching the branch instruction from the branch condition queue before the at least one non-condition instruction is dispatched from the issue queue when the condition code bit is available.

16. A computer program product to control an electronic computer processor to process branch instructions, the computer program product comprising a computer readable storage medium having program instructions embodied therewith, the program instructions executable by the electronic computer processor to perform operations comprising:
dispatching at least one instruction to an issue queue;
generating, via at least one execution unit, a condition code bit corresponding to the at least one instruction;
providing the condition code bit to an information fetch unit (IFU) in direct signal communication with the issue queue via a first signal path;
conditionally issuing the at least one instruction from the issue queue directly to a branch condition queue before the at least one execution unit generates the condition code bit; and
conditionally resolving the branch instruction using the IFU based on the condition code bit,
wherein the first signal path bypasses the branch condition queue, and wherein the issue queue determines an availability of the condition code bit based on the communication with the IFU via the first signal path.

17. The computer program product of claim 16, wherein the at least one instruction is a branch instruction that is dependent on a condition code.

18. The computer program product of claim 17, wherein issuing the at least one instruction from the issue queue comprises:
generating, via a branch execution unit, a branch target address corresponding to the branch instruction;
generating, via an information fetch unit (IFU), an instruction tag indicating a predicted condition code corresponding to the branch instruction; and
storing the instruction tag in the branch condition queue along with the corresponding branch instruction.

19. The computer program product of claim 18, further comprising:
issuing the branch instruction from the branch condition queue when the condition code bit becomes available;
comparing, via the IFU, the condition code bit to the predicted condition code indicated by the instruction tag; and
resolving the branch instruction, via the IFU, in response to the condition code bit matching the predicted condition code indicated by the instruction tag.

20. The computer program product of claim 19, further comprising:
storing, in the issue queue, at least one non-condition instruction that is configured to resolve independently from a condition code; and
dispatching the branch instruction from the branch condition queue before the at least one non-condition instruction is dispatched from the issue queue when the condition code bit is available.

* * * * *